(12) United States Patent
Asheim

(10) Patent No.: US 6,220,855 B1
(45) Date of Patent: Apr. 24, 2001

(54) CANDLE STAND AND WAX RECYCLING ASSEMBLY

(76) Inventor: Steven K. Asheim, 4614 Tropical La., Holiday, FL (US) 34690

( * ) Notice: Subject to any disclaimer, the term of this patent is extended or adjusted under 35 U.S.C. 154(b) by 0 days.

(21) Appl. No.: 09/602,042

(22) Filed: Jun. 23, 2000

(51) Int. Cl.[7] ....................................................... F23D 3/16
(52) U.S. Cl. .......................... 431/294; 431/292; 431/296; 425/803; 264/278; 362/161; 362/181
(58) Field of Search ..................................... 431/294, 292, 431/291, 289, 288, 295, 296; 425/803; 264/275, 278; 362/161, 181, 447

(56) References Cited

U.S. PATENT DOCUMENTS

| | | | | |
|---|---|---|---|---|
| 3,726,632 | * | 4/1973 | Connolly | 431/294 |
| 5,078,945 | * | 1/1992 | Byron | 431/292 |
| 5,718,572 | * | 2/1998 | Hitzel | 431/292 |
| 6,098,953 | * | 8/2000 | Machado | 431/294 |

FOREIGN PATENT DOCUMENTS

| | | | | |
|---|---|---|---|---|
| 2 519 349 | * | 7/1983 | (FR) . | |
| 2 123 543 | * | 2/1984 | (GB) | 431/294 |
| 2 339 613 | * | 2/2000 | (GB) | 431/294 |

* cited by examiner

*Primary Examiner*—Ira S. Lazarus
*Assistant Examiner*—Josiah C. Cocks

(57) ABSTRACT

A candle stand and wax recycling assembly for capturing, retaining, and forming wax run-off from a first candle as the first candle burns during use. The candle stand and wax recycling assembly includes a platform assembly adapted for supporting a first candle, a receptacle coupled beneath said platform assembly adapted for receiving melted wax, a wick member, and a wick holding assembly.

20 Claims, 6 Drawing Sheets

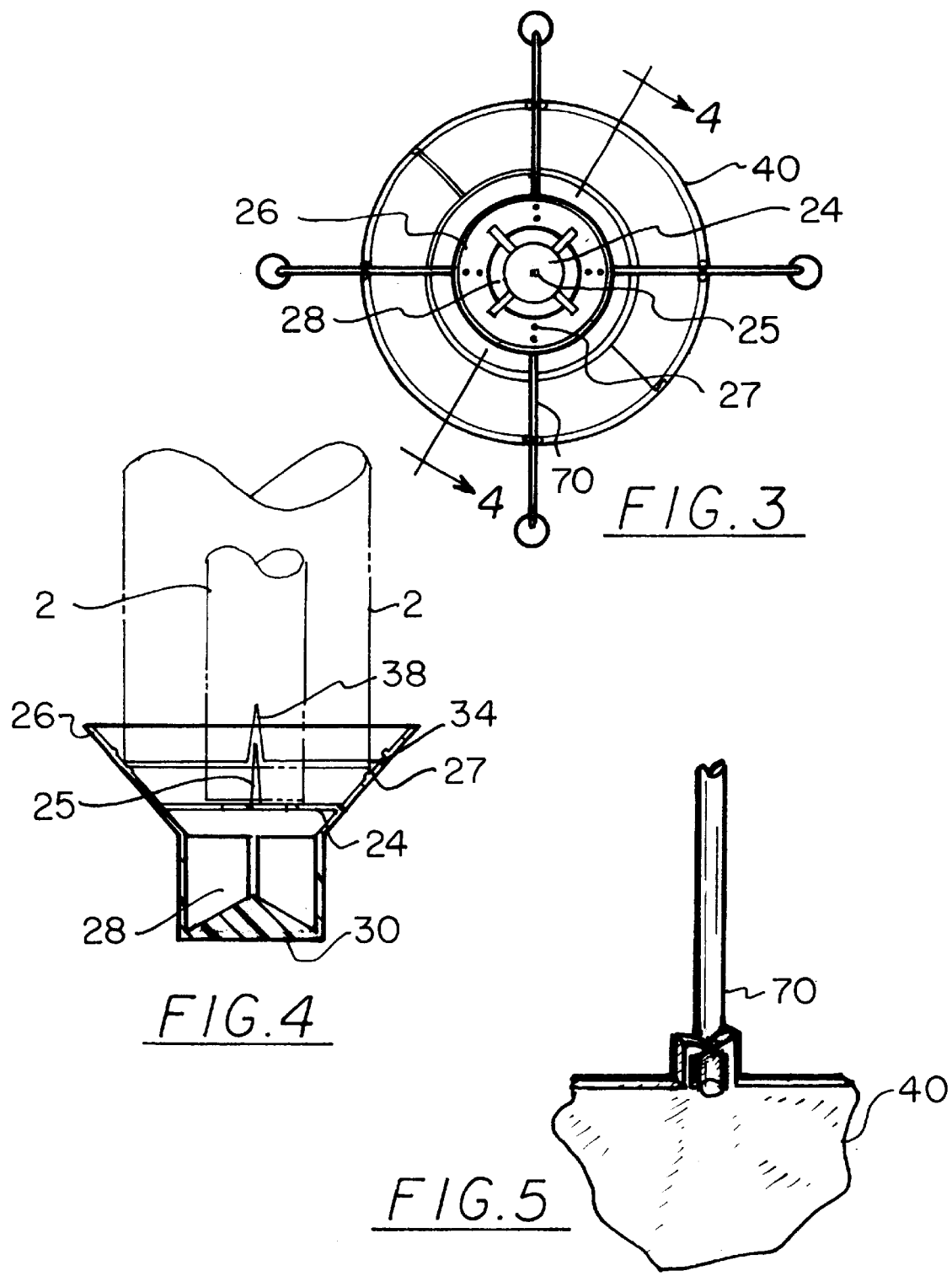

CANDLE STAND AND WAX RECYCLING ASSEMBLY

BACKGROUND OF THE INVENTION

1. Field of the Invention

The present invention relates to candle holders and more particularly pertains to a new candle stand and wax recycling assembly for capturing, retaining, and forming wax run-off from a first candle as the first candle burns during use.

2. Description of the Prior Art

The use of candle holders is known in the prior art. More specifically, candle holders heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,078,945; U.S. Pat. No. 5,069,617; U.S. Pat. No. 4,681,534; U.S. Pat. No. 5,688,040; U.S. Pat. No. 5,848,886; and U.S. Pat. No. Des. 362,143.

While these devices fulfill their respective, particular objectives and requirements, the aforementioned patents do not disclose a new candle stand and wax recycling assembly. The inventive device includes a platform assembly adapted for supporting a first candle, a receptacle coupled beneath said platform assembly adapted for receiving melted wax, a wick member, and a wick holding assembly.

In these respects, the candle stand and wax recycling assembly according to the present invention substantially departs from the conventional concepts and designs of the prior art, and in so doing provides an apparatus primarily developed for the purpose of capturing, retaining, and forming wax run-off from a first candle as the first candle burns during use.

SUMMARY OF THE INVENTION

In view of the foregoing disadvantages inherent in the known types of candle holders now present in the prior art, the present invention provides a new candle stand and wax recycling assembly construction wherein the same can be utilized for capturing, retaining, and forming wax run-off from a first candle as the first candle burns during use.

The general purpose of the present invention, which will be described subsequently in greater detail, is to provide a new candle stand and wax recycling assembly apparatus and method which has many of the advantages of the candle holders mentioned heretofore and many novel features that result in a new candle stand and wax recycling assembly which is not anticipated, rendered obvious, suggested, or even implied by any of the prior art candle holders, either alone or in any combination thereof.

To attain this, the present invention generally comprises a platform assembly adapted for supporting a first candle, a receptacle coupled beneath said platform assembly adapted for receiving melted wax, a wick member, and a wick holding assembly.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new candle stand and wax recycling assembly apparatus and method which has many of the advantages of the candle holders mentioned heretofore and many novel features that result in a new candle stand and wax recycling assembly which is not anticipated, rendered obvious, suggested, or even implied by any of the prior art candle holders, either alone or in any combination thereof.

It is another object of the present invention to provide a new candle stand and wax recycling assembly which may be easily and efficiently manufactured and marketed.

It is a further object of the present invention to provide a new candle stand and wax recycling assembly which is of a durable and reliable construction.

An even further object of the present invention is to provide a new candle stand and wax recycling assembly which is susceptible of a low cost of manufacture with regard to both materials and labor, and which accordingly is then susceptible of low prices of sale to the consuming public, thereby making such candle stand and wax recycling assembly economically available to the buying public.

Still yet another object of the present invention is to provide a new candle stand and wax recycling assembly which provides in the apparatuses and methods of the prior art some of the advantages thereof, while simultaneously overcoming some of the disadvantages normally associated therewith.

Still another object of the present invention is to provide a new candle stand and wax recycling assembly for capturing, retaining, and forming wax run-off from a first candle as the first candle burns during use.

Yet another object of the present invention is to provide a new candle stand and wax recycling assembly which includes a platform assembly adapted for supporting a first candle, a receptacle coupled beneath said platform assembly adapted for receiving melted wax, a wick member, and a wick holding assembly.

Still yet another object of the present invention is to provide a new candle stand and wax recycling assembly that allows the user to make unique candles from excess wax run-off with no additional steps.

Even still another object of the present invention is to provide a new candle stand and wax recycling assembly that provides a stable base for burning a first candle when placed upon a supporting surface.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a schematic top view of the present invention.

FIG. 4 is a schematic cross-sectional view of the present invention taken along line 4—4 of FIG. 3.

FIG. 5 is a schematic detail view of the receptacle and arms of the present invention.

DESCRIPTION OF THE PREFERRED EMBODIMENT

Figure 1:
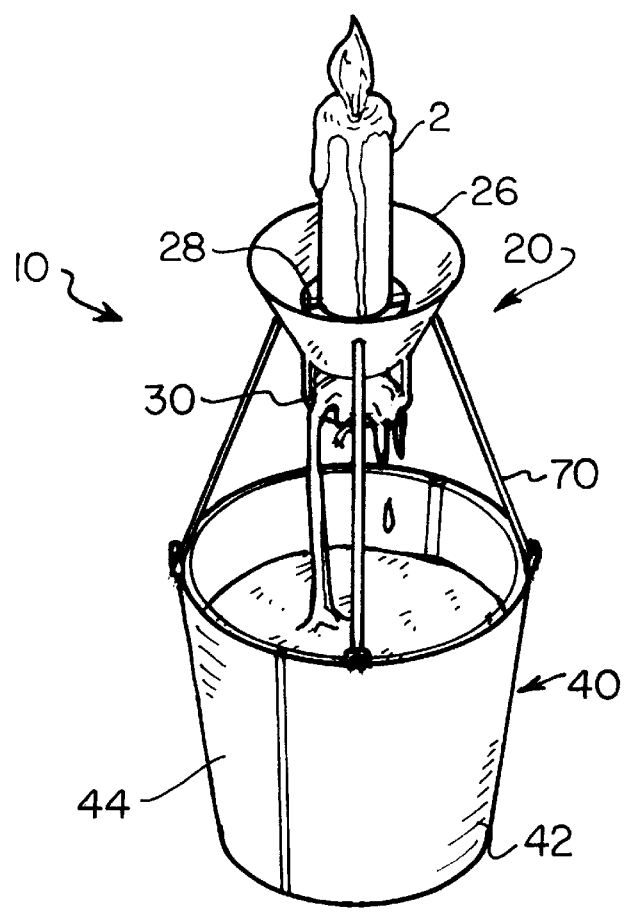
FIG. 1 is a schematic perspective view of a new candle stand and wax recycling assembly according to the present invention.
Figure 2:
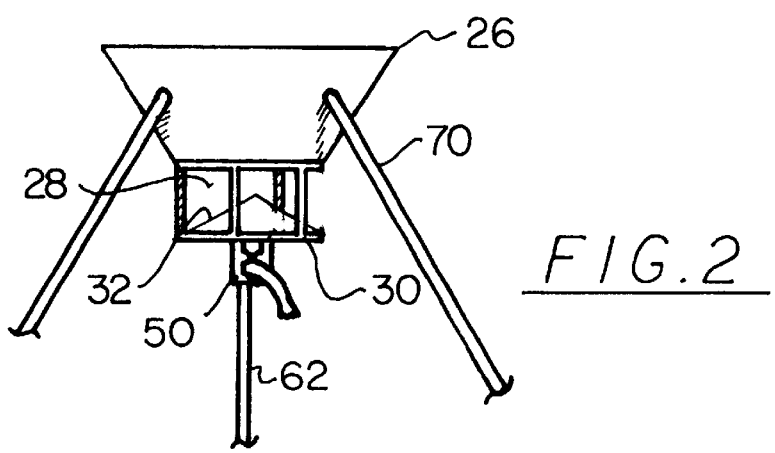
FIG. 2 is a schematic detail side view of the platform portion of the present invention.
Figure 6:
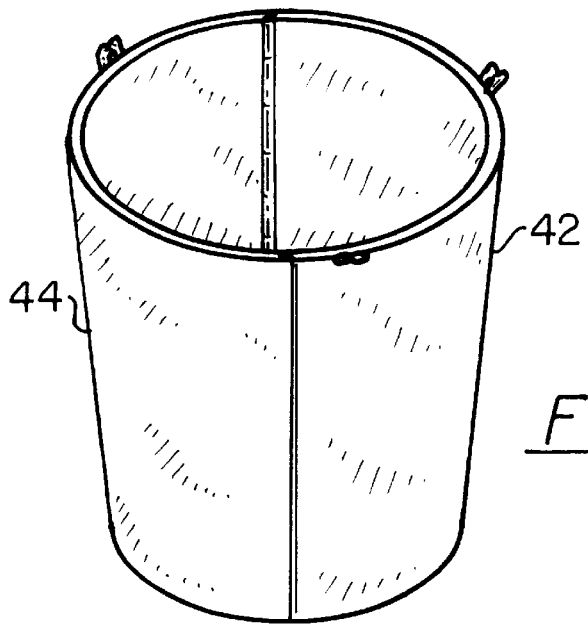
FIG. 6 is a schematic perspective view of the receptacle of the present invention in the closed condition.
Figure 9:
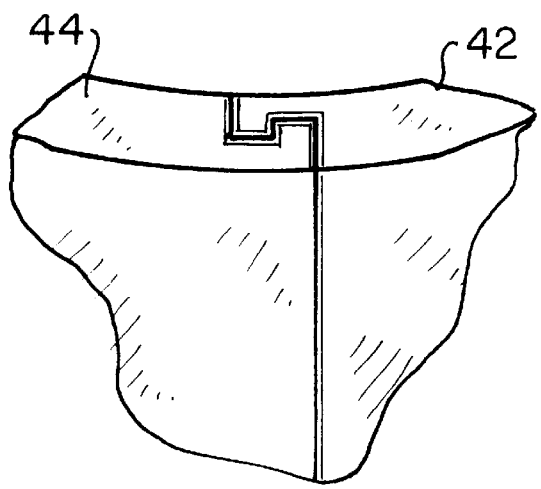
FIG. 9 is a schematic detail view of the first and second wall portions of the present invention.
Figure 8:
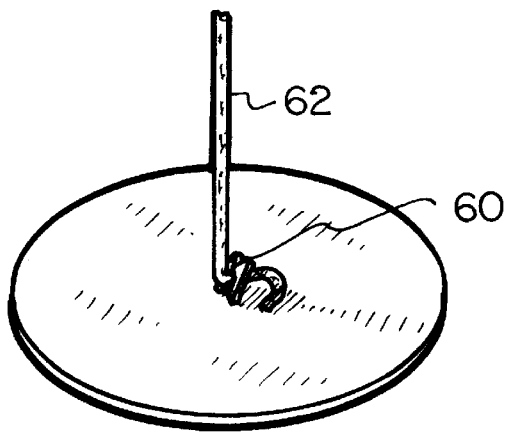
FIG. 8 is a schematic detail view of the wick holding assembly of the present invention.
Figure 7:
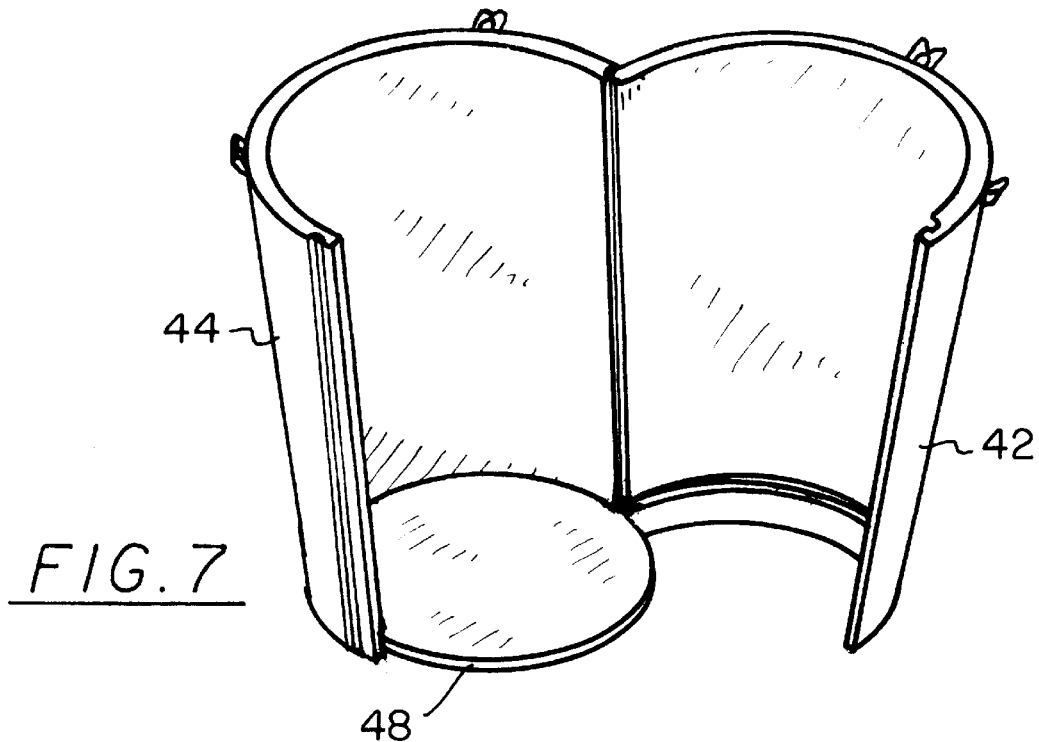
FIG. 7 is a schematic perspective view of the receptacle of the present invention in the open condition.
Figure 10:
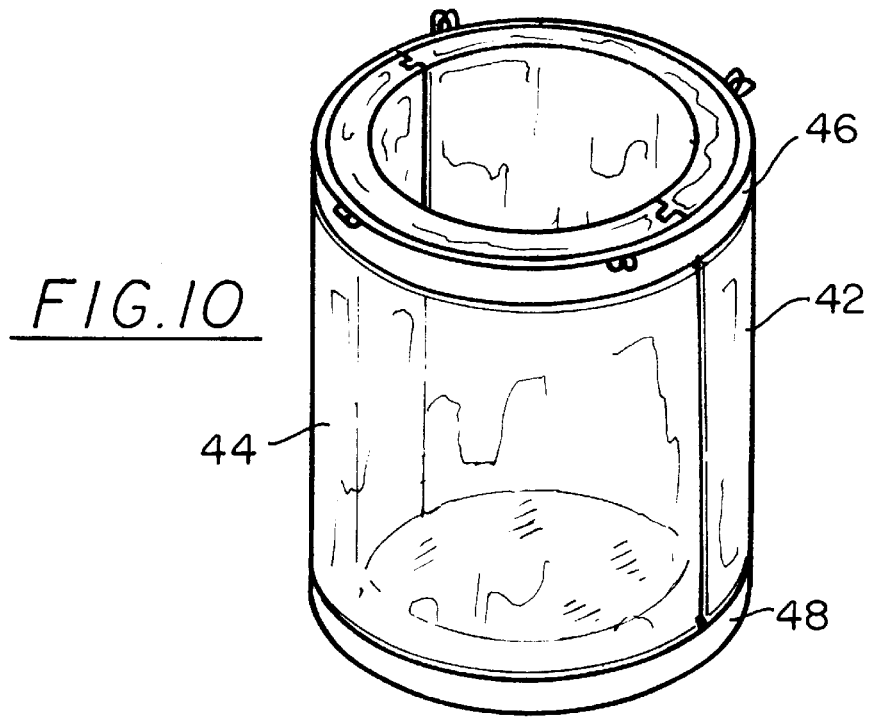
FIG. 10 is a schematic perspective view of the receptacle of the present invention.
Figure 15:
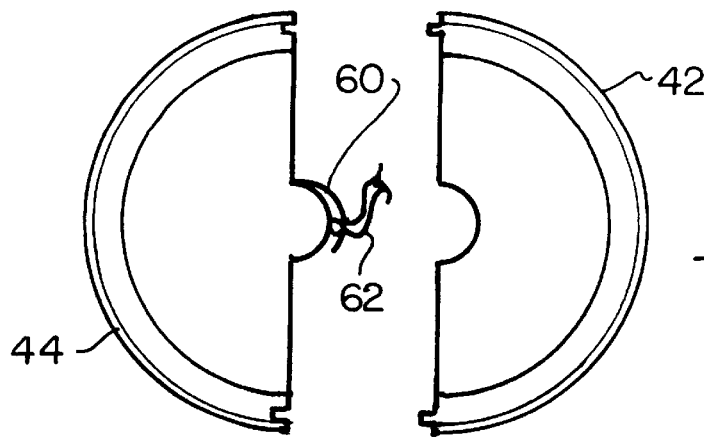
FIG. 15 is a schematic bottom view of the present invention.
Figure 16:
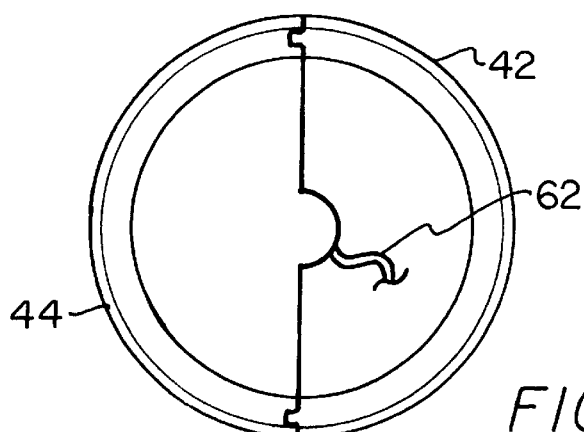
FIG. 16 is a schematic bottom view of the present invention.
Figure 17:
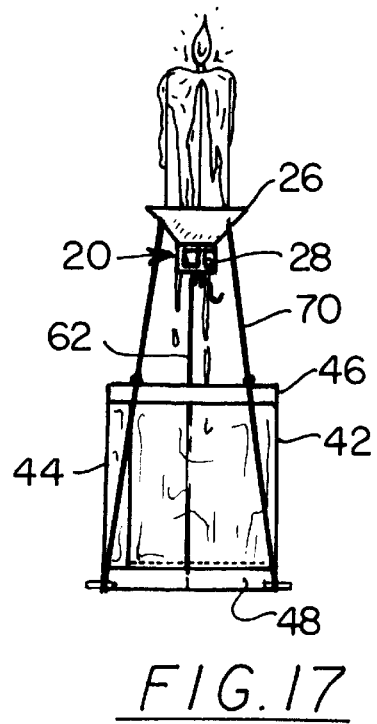
FIG. 17 is a schematic perspective view of the present invention.
Figure 11:
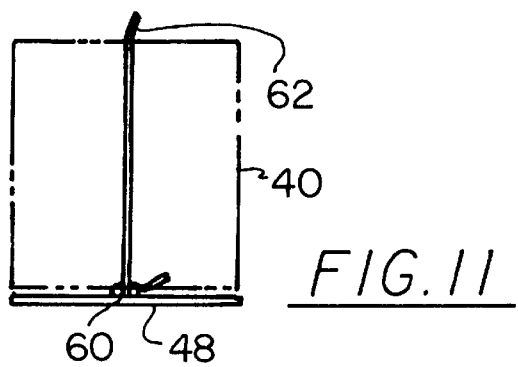
FIG. 11 is a schematic side view of the reseptacle of the present invention.
Figure 12:
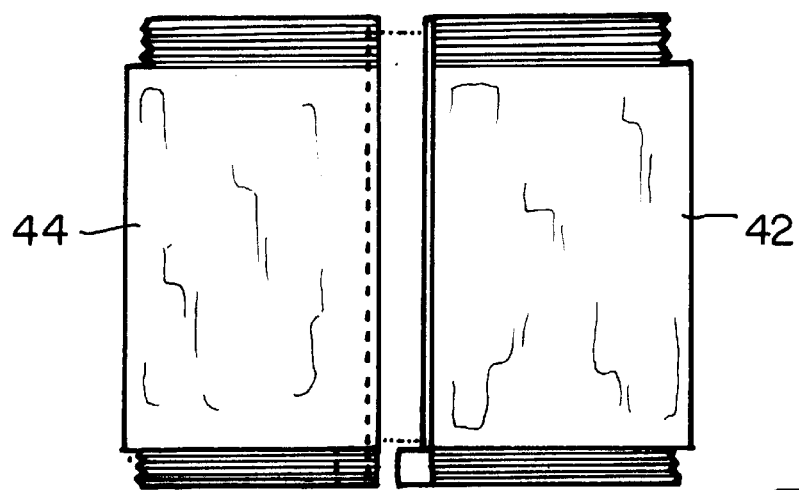
FIG. 12 is a schematic side view of the first and second wall portions of the present invention.
Figure 13:
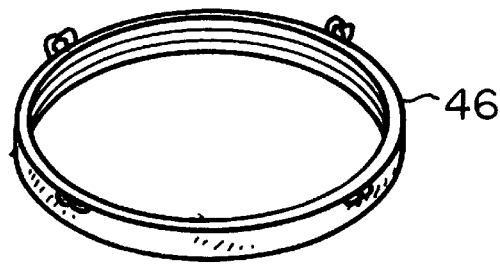
FIG. 13 is a schematic perspective view of the upper ring member of the present invention.
Figure 14:
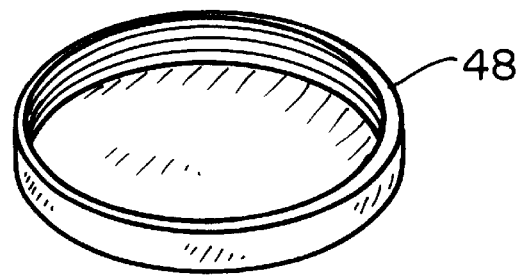
FIG. 14 is a schematic perspective view of the receptacle bottom member of the present invention.

With reference now to the drawings, and in particular to FIGS. 1 through 17 thereof, a new candle stand and wax recycling assembly embodying the principles and concepts of the present invention and generally designated by the reference numeral 10 will be described.

As best illustrated in FIGS. 1 through 17, the candle stand and wax recycling assembly 10 generally comprises a platform assembly 20, a receptacle 40, a wick member 62, a wick holding assembly 60, and a plurality of arms 70.

The platform assembly 20 designed for supporting a first candle 2.

The receptacle 40 is coupled beneath the platform assembly 20. The receptacle 40 is designed for receiving melted wax from the first candle 2 as the first candle 2 burns while positioned on the platform assembly 20.

The wick holding assembly 60 is used for holding the wick 62 upright in the receptacle 40 thus the wick 62 and the receptacle 40 are designed for forming a second candle when melted wax from the first candle 2 hardens around the wick 62 while the wick 62 is positioned in the receptacle 40.

The platform assembly 20 includes a platform portion 22. The platform portion 22 includes a lower deck 24 and an angled perimeter wall 26 extending upwardly and away from an outer perimeter edge of the lower deck 24.

The lower deck 24 includes a plurality of apertures 28. Thus the lower deck 24 is designed for permitting melted wax to pass through the lower deck 24.

The platform assembly 20 includes a wax diverting portion 30. The wax diverting portion 30 is positioned below the lower deck 24.

The wick 62 is couplable to a bottom of the wax diverting portion 30. Thus melted wax is prevented from dripping directly onto a portion of the wick 62 extending above the receptacle 40.

The wax diverting portion 30 includes a generally cone-shaped bottom 32 for facilitating run off of melted wax towards a perimeter edge of the bottom of the wax diverting portion 30.

A platform insert tray 34 is insertable into the platform portion 22 of the platform assembly 20. The platform insert tray 34 is designed for supporting a broad based candle 2 such that an exterior base perimeter of the broad based candle 2 is positionable in spaced relationship to the angled outer perimeter wall of the platform portion 22. The platform insert tray 34 includes a diameter greater than a diameter of the lower deck 24. Thus the platform insert tray 34 is positioned above the lower deck 24 when the platform insert tray 34 is inserted into the platform portion 22. The platform insert 34 includes a grated bottom 36 with a diameter greater than the diameter of the broad based candle 2 for permitting melted wax dripping from an exterior face of the broad based candle 2 to pass through the platform insert tray 34 and through the lower deck 24.

The platform insert tray 34 includes a tray pin 38 extending upwardly from a center of the platform insert tray 34. The tray pin 38 is designed for insertion into the broad based candle 2 for facilitating holding of the broad based candle 2 in a static position relative to the platform insert tray 34.

An inner face of the angled outer perimeter wall 26 of the platform portion 22 includes a plurality of support protrusions 27. The support protrusions 27 extend from the inner face of the angled outer perimeter wall 26 of the platform portion 22 for supporting the platform insert tray 34 when the platform insert tray 34 is inserted into the platform portion 22 of the platform assembly 20. Thus the support protrusions 27 facilitate prevention of tipping of the platform insert tray 34 when the platform insert tray 34 is positioned in the platform portion 22.

The lower deck 24 includes a lower deck pin 25 extending upwardly from a center of the lower deck 24. The lower deck pin 25 is designed for insertion into the first candle 2 for facilitating holding of the first candle 2 in a static position relative to the lower deck 24.

The receptacle 40 includes a first wall portion 42 and a second wall portion 44. The first 42 and second wall portions 44 are separable from each other. Thus the receptacle 40 is designed for facilitating removal of the second candle from the receptacle 40 by separating the first wall portion 42 from the second wall portion 44.

An upper portion of an outer wall of the receptacle 40 is threaded. An upper ring member 46 is threaded for engaging the upper portion of the outer wall of the receptacle 40. Thus the first 42 and second wall portions 44 are held together by the upper ring member 46 when the upper ring member 46 is engaged to the upper portion.

A lower portion of an outer wall of the receptacle 40 is threaded. A receptacle bottom member 48 includes a threaded annular wall for engaging the lower portion of the outer wall of the receptacle 40. Thus the first 42 and second wall portions 44 are held together by the receptacle bottom member 48 when the receptacle bottom member 48 is engaged to the lower portion.

The platform assembly 20 includes a clip member 50 for holding an upper end of the wick member 62.

The first 42 and second wall portions 44 each includes a respective planar bottom portion for forming a bottom of the receptacle 40 when the first 42 and second wall portions 44 are joined together.

A lower end of the wick member 62 is insertable between the planar bottom portions when the first 42 and second wall portions 44 are joined together to form the receptacle 40. Thus the wick member 62 is held in a taut position between the bottom of the receptacle 40 and the clip member 50.

The plurality of arms 70 extend between the platform assembly 20 and the upper ring member 46 for holding the platform assembly 20 above the receptacle 40 when the upper ring member 46 is engaged to the receptacle 40.

The first 42 and second wall portions 44 are hingedly coupled to each other. Thus a distal side of the receptacle 40 is openable to facilitate removal of the second candle from the receptacle 40.

The receptacle bottom member 48 includes a closed bottom 52 for positioning beneath the bottom of the receptacle 40 when the receptacle bottom member 48 is engaged to the receptacle 40.

In use, a first candle is placed by the user on the platform portion of the candle stand and wax recycling assembly. The first candle is positioned in such a manner that the lower deck pin penetrates the base of the first candle and holds the first candle in a static position relative to the platform assembly. The first candle is then used in the conventional manner. The excess wax which runs off of the candle during the candles conventional use flows through the apertures in the platform portion and is collected in the receptacle. As the receptacle fills the wick member held taught by the clip member and the wick holding assembly is covered by the excess wax forming a second candle.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A candle stand for recycling wax, said candle stand comprising:

a platform assembly adapted for supporting a first candle;

a receptacle coupled beneath said platform assembly, said receptacle being adapted for receiving melted wax from the first candle as the first candle burns while positioned on said platform assembly;

a wick member;

a wick holding assembly for holding said wick upright in said receptacle whereby said wick and said receptacle are adapted for forming a second candle when melted wax from the first candle hardens around said wick while said wick is positioned in said receptacle;

said platform assembly including a platform portion, said platform portion having a lower deck and an angled perimeter wall extending upwardly and away from an outer perimeter edge of said lower deck;

said lower deck including a plurality of apertures whereby said lower deck is adapted for permitting melted wax to pass through said lower deck;

said platform assembly including a wax diverting portion, said wax diverting portion being positioned below said lower deck;

said wick being couplable to a bottom of said wax diverting portion whereby melted wax is prevented from dripping directly onto a portion of said wick extending above said receptacle.

2. The candle stand of claim 1, further comprising:

said wax diverting portion having a generally cone-shaped bottom for facilitating run off of melted wax towards a perimeter edge of said bottom of said wax diverting portion.

3. The candle stand of claim 1, further comprising:

said lower deck having a lower deck pin extending upwardly from a center of said lower deck, said lower deck pin being adapted for insertion into the first candle for facilitating holding of the first candle in a static position relative to said lower deck.

4. The candle stand of claim 1, further comprising:

a plurality of arms extending between said platform assembly and said receptacle for holding said platform assembly above said receptacle.

5. The candle stand of claim 1, further comprising:

said receptacle having a first wall portion and a second wall portion, said first and second wall portions being separable from each other whereby said receptacle is adapted for facilitating removal of the second candle from the receptacle by separating said first wall portion from said second wall portion.

6. The candle stand of claim 5, further comprising:

an upper portion of an outer wall of said receptacle being threaded;

an upper ring member being threaded for engaging said upper portion of said outer wall of said receptacle whereby said first and second wall portions are held together by said upper ring member when said upper ring member is engaged to said upper portion.

7. The candle stand of claim 5, further comprising:

a lower portion of an outer wall of said receptacle being threaded;

a receptacle bottom member having a threaded annular wall for engaging said lower portion of said outer wall of said receptacle whereby said first and second wall portions are held together by said receptacle bottom member when said receptacle bottom member is engaged to said lower portion.

8. The candle stand of claim 5, further comprising:

said platform assembly including a clip member for holding an upper end of said wick member.

9. The candle stand of claim 8, further comprising:

said first and second wall portions each including a respective planar bottom portion for forming a bottom of said receptacle when said first and second wall portions are joined together;

a lower end of said wick member being insertable between said planar bottom portions when said first and second wall portions are joined together to form said receptacle whereby said wick member is holdable in a taut position between said bottom of said receptacle and said clip member.

10. The candle stand of claim 6, further comprising:

a plurality of arms extending between said platform assembly and said upper ring member for holding said platform assembly above said receptacle when said upper ring member is engaged to said receptacle.

11. The candle stand of claim 5, further comprising:

said first and second wall portions being hingedly coupled to each other whereby a distal side of said receptacle is openable to facilitate removal of the second candle from the receptacle.

12. The candle stand of claim 7, further comprising:

said first and second wall portions each including a respective planar bottom portion for forming a bottom of said receptacle when said first and second wall portions are joined together;

said receptacle bottom member having a closed bottom for positioning beneath said bottom of said receptacle when said receptacle bottom member is engaged to said receptacle.

13. A candle stand for recycling wax, said candle stand comprising:

a platform assembly adapted for supporting a first candle;

a receptacle coupled beneath said platform assembly, said receptacle being adapted for receiving melted wax from the first candle as the first candle burns while positioned on said platform assembly;

a wick member;

a wick holding assembly for holding said wick upright in said receptacle whereby said wick and said receptacle are adapted for forming a second candle when melted wax from the first candle hardens around said wick while said wick is positioned in said receptacle;

said platform assembly including a platform portion, said platform portion having a lower deck and an angled perimeter wall extending upwardly and away from an outer perimeter edge of said lower deck;

said lower deck including a plurality of apertures whereby said lower deck is adapted for permitting melted wax to pass through said lower deck;

a platform insert tray insertable into said platform portion of said platform assembly, said platform insert tray being adapted for supporting a broad based candle such that an exterior base perimeter of the broad based candle is positionable in spaced relationship to said angled outer perimeter wall of said platform portion, said platform insert tray having a diameter greater than a diameter of said lower deck whereby said platform insert tray is positioned above said lower deck when said platform insert tray is inserted into said platform portion, said platform insert having a grated bottom having a diameter greater than the diameter of the broad based candle for permitting melted wax dripping from an exterior face of the broad based candle to pass through said platform insert tray and through said lower deck.

14. The candle stand of claim 13, further comprising:

said platform insert tray having a tray pin extending upwardly from a center of said platform insert tray, said tray pin being adapted for insertion into the broad based candle for facilitating holding of the broad based candle in a static position relative to said platform insert tray.

15. The candle stand of claim 13, further comprising:

an inner face of said angled outer perimeter wall of said platform portion having a plurality of support protrusions extending from said inner face of said angled outer perimeter wall of said platform portion for supporting said platform insert tray when said platform insert tray is inserted into said platform portion of said platform assembly whereby said support protrusions facilitate prevention of tipping of said platform insert tray when said platform insert tray is positioned in said platform portion.

16. The candle stand of claim 13, further comprising:

said receptacle having a first wall portion and a second wall portion, said first and second wall portions being separable from each other whereby said receptacle is adapted for facilitating removal of the second candle from the receptacle by separating said first wall portion from said second wall portion.

17. The candle stand of claim 16, further comprising:

an upper portion of an outer wall of said receptacle being threaded;

an upper ring member being threaded for engaging said upper portion of said outer wall of said receptacle whereby said first and second wall portions are held together by said upper ring member when said upper ring member is engaged to said upper portion.

18. The candle stand of claim 16, further comprising:

a lower portion of an outer wall of said receptacle being threaded;

a receptacle bottom member having a threaded annular wall for engaging said lower portion of said outer wall of said receptacle whereby said first and second wall portions are held together by said receptacle bottom member when said receptacle bottom member is engaged to said lower portion.

19. The candle stand of claim 16, further comprising:

said first and second wall portions being hingedly coupled to each other whereby a distal side of said receptacle is openable to facilitate removal of the second candle from the receptacle.

20. A candle stand for recycling wax, said candle stand comprising:

a platform assembly adapted for supporting a first candle;

a receptacle coupled beneath said platform assembly, said receptacle being adapted for receiving melted wax from the first candle as the first candle burns while positioned on said platform assembly;

a wick member;

a wick holding assembly for holding said wick upright in said receptacle whereby said wick and said receptacle are adapted for forming a second candle when melted wax from the first candle hardens around said wick while said wick is positioned in said receptacle;

said platform assembly including a platform portion, said platform portion having a lower deck and an angled perimeter wall extending upwardly and away from an outer perimeter edge of said lower deck;

said lower deck including a plurality of apertures whereby said lower deck is adapted for permitting melted wax to pass through said lower deck;

said platform assembly including a wax diverting portion, said wax diverting portion being positioned below said lower deck;

said wick being couplable to a bottom of said wax diverting portion whereby melted wax is prevented from dripping directly onto a portion of said wick extending above said receptacle;

said wax diverting portion having a generally cone-shaped bottom for facilitating run off of melted wax towards a perimeter edge of said bottom of said wax diverting portion;

a platform insert tray insertable into said platform portion of said platform assembly, said platform insert tray being adapted for supporting a broad based candle such that an exterior base perimeter of the broad based candle is positionable in spaced relationship to said angled outer perimeter wall of said platform portion, said platform insert tray having a diameter greater than a diameter of said lower deck whereby said platform insert tray is positioned above said lower deck when said platform insert tray is inserted into said platform portion, said platform insert having a grated bottom having a diameter greater than the diameter of the broad based candle for permitting melted wax dripping from an exterior face of the broad based candle to pass through said platform insert tray and through said lower deck;

said platform insert tray having a tray pin extending upwardly from a center of said platform insert tray, said tray pin being adapted for insertion into the broad based candle for facilitating holding of the broad based candle in a static position relative to said platform insert tray;

an inner face of said angled outer perimeter wall of said platform portion having a plurality of support protrusions extending from said inner face of said angled outer perimeter wall of said platform portion for supporting said platform insert tray when said platform insert tray is inserted into said platform portion of said platform assembly whereby said support protrusions facilitate prevention of tipping of said platform insert tray when said platform insert tray is positioned in said platform portion;

said lower deck having a lower deck pin extending upwardly from a center of said lower deck, said lower deck pin being adapted for insertion into the first candle for facilitating holding of the first candle in a static position relative to said lower deck;

said receptacle having a first wall portion and a second wall portion, said first and second wall portions being separable from each other whereby said receptacle is adapted for facilitating removal of the second candle from the receptacle by separating said first wall portion from said second wall portion;

an upper portion of an outer wall of said receptacle being threaded;

an upper ring member being threaded for engaging said upper portion of said outer wall of said receptacle whereby said first and second wall portions are held together by said upper ring member when said upper ring member is engaged to said upper portion;

a lower portion of an outer wall of said receptacle being threaded;

a receptacle bottom member having a threaded annular wall for engaging said lower portion of said outer wall of said receptacle whereby said first and second wall portions are held together by said receptacle bottom member when said receptacle bottom member is engaged to said lower portion;

said platform assembly including a clip member for holding an upper end of said wick member;

said first and second wall portions each including a respective planar bottom portion for forming a bottom of said receptacle when said first and second wall portions are joined together;

a lower end of said wick member being insertable between said planar bottom portions when said first and second wall portions are joined together to form said receptacle whereby said wick member is holdable in a taut position between said bottom of said receptacle and said clip member;

a plurality of arms extending between said platform assembly and said upper ring member for holding said platform assembly above said receptacle when said upper ring member is engaged to said receptacle;

said first and second wall portions being hingedly coupled to each other whereby a distal side of said receptacle is openable to facilitate removal of the second candle from the receptacle; and said receptacle bottom member having a closed bottom for positioning beneath said bottom of said receptacle when said receptacle bottom member is engaged to said receptacle.

* * * * *